R. W. ALEXANDER.
CULTIVATOR.

No. 190,179. Patented May 1, 1877.

Witnesses:
M. H. Barringer
A. McCallum

Inventor:
Ralph W. Alexander,
By W. B. Richards,
Atty.

UNITED STATES PATENT OFFICE.

RALPH W. ALEXANDER, OF GALESBURG, ILLINOIS.

IMPROVEMENT IN CULTIVATORS.

Specification forming part of Letters Patent No. 190,179, dated May 1, 1877; application filed November 9, 1876.

*To all whom it may concern:*

Be it known that I, RALPH W. ALEXANDER, of Galesburg, in the county of Knox and State of Illinois, have invented certain new and useful Improvements in Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of my invention relates to improvements in that class of cultivators known generally as wheel tongueless cultivators.

The object of my invention is to provide means for suspending the plows above the ground for convenience of removal from place to place, or transportation locally on its own wheels; and the invention consists in constructing each plow-beam in two parts, and hinging the rear part carrying the shovels or cultivator-plows to the front part in such manner that, when the rear part is reversed to elevate the plows, its front end will be depressed and form a runner to slide upon the ground and hold them in said elevated position.

The invention further consists in the construction and combination of parts, as more fully hereinafter described, and pointed out by the claims.

Figure 1:
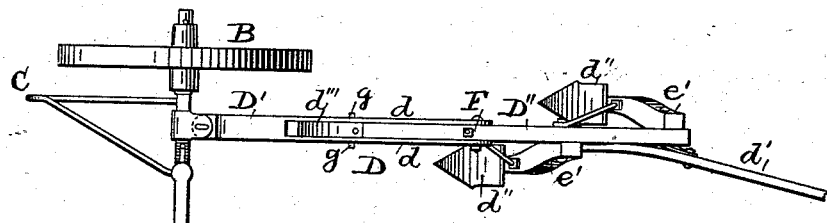
Figure 2:
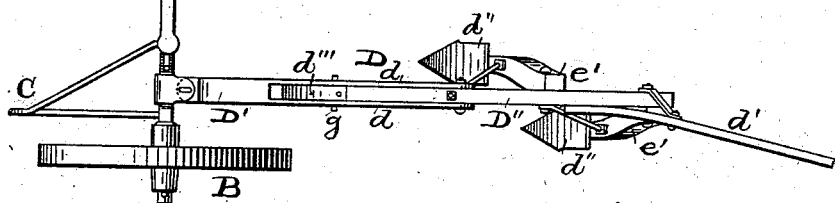
Figure 2:
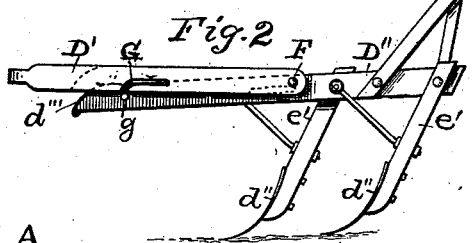
Figure 3:
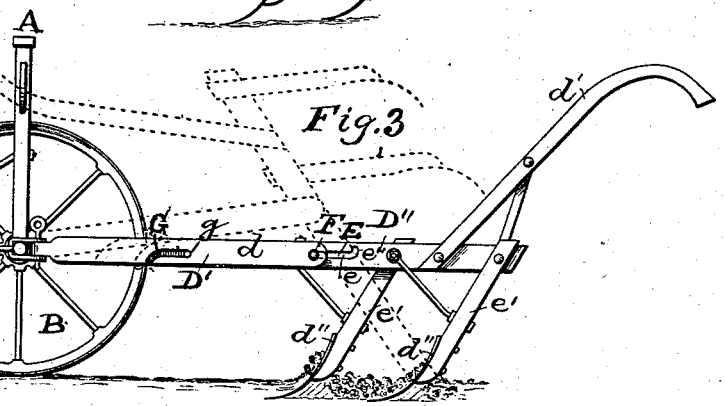

In the accompanying drawings, Figure 1 is a top-plan view of a cultivator embodying my invention. Fig. 2 is a side elevation of one plow-beam and plows. Fig. 3 is a side elevation of the machine with near wheel removed.

The same letter indicates the same part in the drawings.

A represents an ordinary style of tongueless-cultivator axle, supported on wheels B B, and provided with draft-plates C of any common kind. D D represent the plow-beams. Each beam is constructed in two parts, a forward part, $D'$, and rear part $D''$. The forward part $D'$ is hinged to the axle A at its front end in any ordinary manner, and its main and rear portion is formed of two side plates, $d\,d$, between which the rear part $D''$ fits snugly, and extends from near the front ends of the plates $d$ rearward of their rear ends, as shown in the drawings, and is provided at its rear end with any ordinary handle, $d'$, standards $e'$, and shovels or plows $d''$, and its forward end provided with a runner-shaped plate, $d'''$. The part $D''$ is hinged and connected to the part $D'$ as follows: $e$ represents the main part, and $e''$ the foot part of an L-shaped slot, E, cut through the medial part of the beam $D''$, and F is a bolt connecting the rear ends of the plates $d$ and passing through the slot E. G is a slot, cut one in each plate $d$, extending to the lower edge of said plates, as shown plainly at Figs. 2 and 3, and $g$ are studs, one on each side of the forward end of the part $D''$.

The position of the parts when the plows are in use in cultivation in the field is shown at Figs. 1 and 2. The bolt F being in the anterior end of the slot E, and the studs $g$ being in the posterior ends of the slots G, will, as is evident, render the connection between the beams $D'$ and $D''$ rigid. To invert the part $D''$, it is first pressed forward on the part $D'$ until it occupies the position in relation to said part $D'$, (shown at Fig. 2,) with the bolt F in the posterior end of the slot E, and the studs $g$ in the anterior ends of the slots G, when it may be turned in a vertical plane on the bolt F as a pivot, the studs $g$ passing out of the slots G, and allowing the said part $D''$ to be turned until the handle $d'$ rests in a hook, $a$, projecting from the side of the axle A, and the runner $d'''$ rests on the ground, as shown by dotted lines at Fig. 3, and in which position the machine may be moved in the obvious manner.

The bolt F resting in the foot $e'$ of the slot E will retain the parts $D'$ $D''$ in their proper relative positions to guide the studs $g$ in entering the open-ended slots G, when the part $D''$ is returned to its working position.

Having thus described my invention, what I claim as new, and desire to secure by Letters Patent, is—

1. A cultivator-plow beam, made in two parts, $D'$ $D''$, the latter made to slide back and forth within the former, as described, and having its forward end formed as a shoe or runner, substantially as and for the purpose specified.

2. The plates *d d*, having slots G and bolt F, arranged to operate with the beam D″, having slot E and studs *g*, substantially as described, and for the purpose specified.

3. The hook *a* on the side of the axle A, combined to operate with the hinged plow-beams D D, substantially as described, and for the purpose specified.

In testimony that I claim the foregoing as my own I affix my signature in presence of two witnesses.

RALPH W. ALEXANDER.

Witnesses:
   THOS. McKEE,
   W. B. RICHARDS.